(12) United States Patent
Plesniak et al.

(10) Patent No.: US 10,454,407 B2
(45) Date of Patent: Oct. 22, 2019

(54) PHOTOVOLTAIC CANOPY FOR CHARGING OF VEHICLE RECHARGEABLE BATTERY SYSTEM

(71) Applicants: Adam Peter Plesniak, Huntington Beach, CA (US); Robert Bruce Gordon, Monrovia, CA (US); Christoper Augustus Faith, Long Beach, CA (US)

(72) Inventors: Adam Peter Plesniak, Huntington Beach, CA (US); Robert Bruce Gordon, Monrovia, CA (US); Christoper Augustus Faith, Long Beach, CA (US)

( * ) Notice: Subject to any disclaimer, the term of this patent is extended or adjusted under 35 U.S.C. 154(b) by 70 days.

(21) Appl. No.: 15/696,414

(22) Filed: Sep. 6, 2017

(65) Prior Publication Data

US 2018/0072164 A1    Mar. 15, 2018

Related U.S. Application Data

(60) Provisional application No. 62/394,759, filed on Sep. 15, 2016.

(51) Int. Cl.
*H02S 10/40*      (2014.01)
*B60L 8/00*       (2006.01)
(Continued)

(52) U.S. Cl.
CPC .............. *H02S 10/40* (2014.12); *B60L 8/003* (2013.01); *B60L 53/00* (2019.02); *B62J 17/08* (2013.01); *B62M 6/85* (2013.01); *H02J 7/355* (2013.01); *H02S 20/30* (2014.12); *H02S 40/34* (2014.12); *B60L 2200/12* (2013.01); *B62J 2017/083* (2013.01); *B62J 2017/086* (2013.01); *H02S 40/38* (2014.12); *Y02T 10/7005* (2013.01); *Y02T 10/7072* (2013.01); *Y02T 10/7083* (2013.01); *Y02T 10/7094* (2013.01); *Y02T 90/14* (2013.01)

(58) Field of Classification Search
CPC .......... H02S 10/40; H02S 20/30; H02S 40/38; B60L 8/003; B62M 6/85; B62D 25/06; B62J 17/08; B62J 2017/083; B62J 2017/086
See application file for complete search history.

(56) References Cited

U.S. PATENT DOCUMENTS

| 8,448,898 B1 * | 5/2013 | Frolov | B64C 39/024 244/59 |
| 2003/0217874 A1 * | 11/2003 | Schoenberg | B60K 1/04 180/2.2 |

FOREIGN PATENT DOCUMENTS

ES        2360001 A1 *   5/2011  ............. B62M 6/85

OTHER PUBLICATIONS

English machine translation of ES 2360001 A1. (Year: 2011).*

* cited by examiner

*Primary Examiner* — Lindsey A Bernier
(74) *Attorney, Agent, or Firm* — Ahmadshahi & Associates

(57) ABSTRACT

A canopy for a vehicle, such as an electric bicycle, comprises a front assembly, a rear assembly, and a photovoltaic panel operative to charge the vehicle's batteries. The front and rear assemblies comprise struts which may be curved to make the canopy more aesthetic. The assemblies comprise struts which may be curved to any arbitrary shape such as circular or elliptical. The photovoltaic panel may be made from flexible material to accommodate the curved shape of the assemblies. The canopy may further include an output power controller to control the output power of the photovoltaic panel.

9 Claims, 4 Drawing Sheets

(51) Int. Cl.
*B62J 17/08* (2006.01)
*H02S 20/30* (2014.01)
*H02J 7/35* (2006.01)
*B62M 6/85* (2010.01)
*B60L 53/00* (2019.01)
*H02S 40/34* (2014.01)
*H02S 40/38* (2014.01)

PHOTOVOLTAIC CANOPY FOR CHARGING OF VEHICLE RECHARGEABLE BATTERY SYSTEM

CROSS REFERENCE TO RELATED APPLICATIONS

The present patent application is a formalization of a previously filed provisional patent application entitled "Photovoltaic Canopy for Charging of Vehicle Rechargeable Battery System," filed 2016 Sep. 15, as U.S. patent application Ser. No. 62/394,759 by the inventor(s) named in this application. This patent application claims the benefit of the filing date of the cited provisional patent application according to the statutes and rules governing provisional patent applications, particularly 35 USC § 119 and 37 CFR § 1.78. The specification and drawings of the cited provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

The present invention relates to a canopy for a vehicle having a front assembly, a rear assembly, and a photovoltaic panel operative to charge the vehicle's battery system. Utilizing a flexible photovoltaic panel in combination with curved rear and front assemblies that conform to the vehicle's configuration, the canopy provides an aesthetically desirable yet efficiently functional recharging system for the vehicle.

BACKGROUND

Electric vehicles have been gaining popularity and will continue to provide efficient means of transportation to the masses. Electric vehicles include electric cars, electric trains, and electric bicycles, just to name a few. In particular, an electric bicycle or e-bike is configured to assist the rider with pedaling and as such they are not electric motorcycles. Therefore, in most jurisdictions, e-bikes are not subject to the more stringent regulations involving motor vehicles. Nevertheless, an e-bike includes a battery system which powers its electric motor. Furthermore, a typical electric bicycle has a curved body frame. Following a certain number of hours of usage, the battery system has to be recharged or the onboard electric motor will not function properly. A photovoltaic panel or module is an assembly of photovoltaic solar cells which, in turn, are electrical devices that convert the energy of light directly into electricity by the photovoltaic effect. Flexible solar panels are used where the surface of the panel has to accommodate shapes other than flat surfaces.

Conventional electric vehicles have used photovoltaic panels to charge their onboard batteries. However, frame assemblies which are utilized to support these panels are often utilitarian at the expense of aesthetics. Therefore, there is a need for a visually appealing yet highly efficient and functional canopy that can be coupled with a vehicle to recharge its onboard battery system via a photovoltaic panel.

SUMMARY

In one aspect, a canopy for a vehicle is disclosed wherein the canopy comprises a rear assembly comprising a first rear strut and a second rear strut disposed a first width from the first rear strut, a front assembly comprising a first front strut and a second front strut disposed a second width from the first front strut, and a photovoltaic panel disposed between the rear assembly and the front assembly, wherein a first end of the rear assembly is coupled with a rear end of the vehicle, and wherein a first end of the front assembly is coupled with a front end of the vehicle.

Preferably, the rear assembly comprises a rear curved section. Preferably, the second end of the rear assembly is coupled with a second end of the front assembly. Preferably, the rear curved section comprises a rear circular arc and a rear elliptical arc. Preferably, the rear circular arc comprises a rear radius $R_R$ and a rear central angle $\theta_R$, and the rear elliptical arc comprises a rear center $C_R$, a rear semi major axis $A_R$, and a rear semi minor axis $B_R$.

Preferably, at least one of the first rear strut, the second rear strut, the first front strut, and the second front strut is made from an 18-gauge aluminum tubing having an outer diameter of 0.63 inches and inner diameter of 0.57 inches.

Preferably, the first width is equal to the second width.

Preferably, the first width is equal to 21.25 inches.

Preferably, the photovoltaic panel comprises semiconducting material.

Preferably, the photovoltaic panel comprises a flexible solar panel.

Preferably, the vehicle is an electric bicycle.

Preferably, the vehicle further comprises a battery. Preferably, the photovoltaic panel further comprises an electrical output line coupled with the battery and operative to charge the battery. Preferably, the canopy further comprises an electrical power controller coupled with the battery and wherein the photovoltaic panel further comprises an electrical output line coupled with the electrical power controller. Preferably, the electrical power controller comprises at least one of a voltage regulator, a boost converter, and a buck converter.

Preferably, the front assembly comprises a front curved section. Preferably, the second end of the rear assembly is coupled with a second end of the front assembly. Preferably, the front curved section comprises a front circular arc and a front elliptical arc. Preferably, the front circular arc comprises a front radius $R_F$ and a front central angle $\theta_F$, and the front elliptical arc comprises a front center $C_F$, a front semi major axis $A_F$, and a front semi minor axis $B_F$.

In another aspect, a canopy for a vehicle is disclosed wherein the canopy comprises a rear assembly comprising a first rear strut and a second rear strut disposed a first width from the first rear strut, and a photovoltaic panel disposed on the rear assembly, wherein a first end of the rear assembly is coupled with a rear end of the vehicle.

Preferably, the rear assembly comprises a rear curved section.

In another aspect, a method of charging an electric vehicle via a canopy is disclosed wherein the method comprises providing a rear assembly comprising a first rear strut and a second rear strut disposed a first width from the first rear strut, providing a front assembly comprising a first front strut and a second front strut disposed a second width from the first front strut, and providing a photovoltaic panel disposed between the rear assembly and the front assembly, wherein a first end of the rear assembly is coupled with a rear end of the vehicle, wherein a first end of the front assembly is coupled with a front end of the vehicle, wherein the vehicle further comprises a battery, and wherein the photovoltaic panel further comprises an electrical output line coupled with the battery and operative to charge the battery.

DETAILED DESCRIPTION OF THE PRESENTLY PREFERRED EMBODIMENTS

Figure 1:
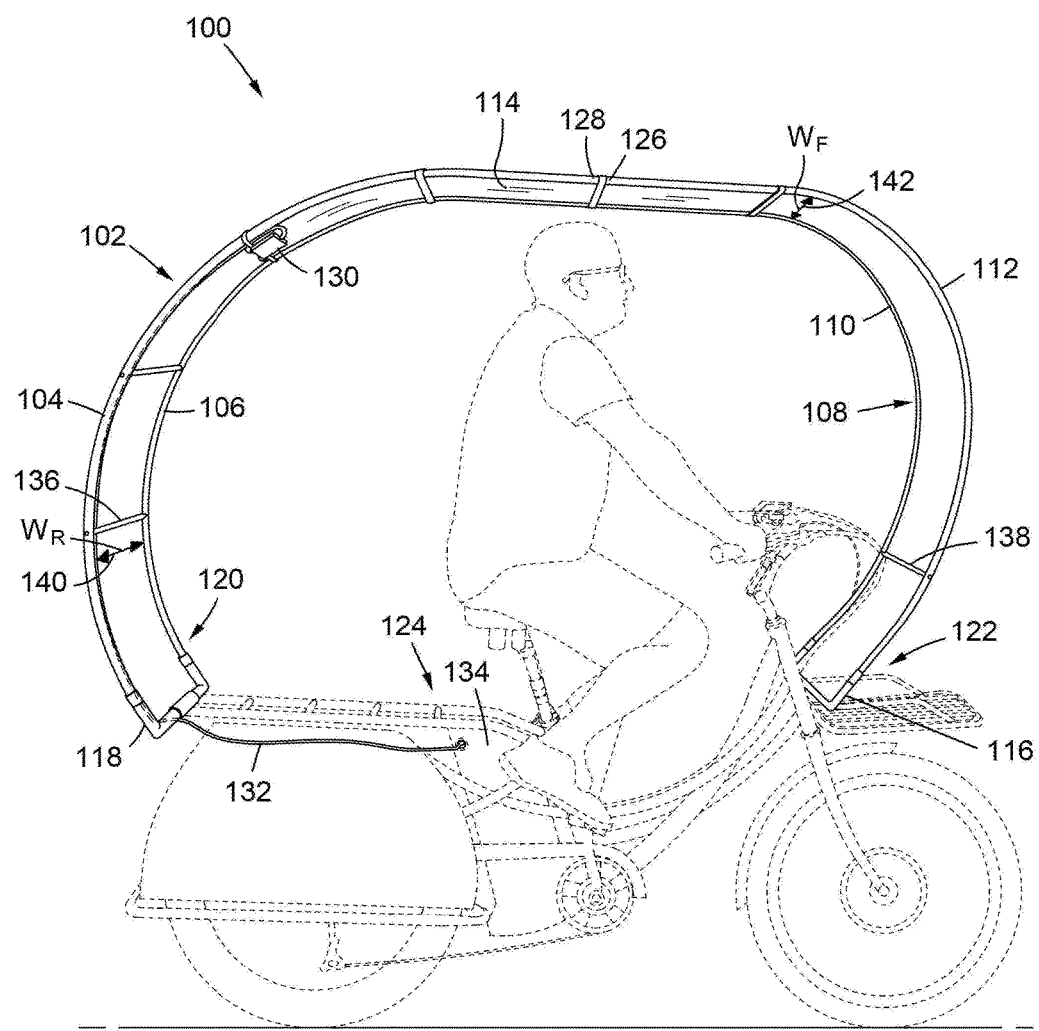
FIG. 1 shows a perspective view of a preferred embodiment of a canopy for a vehicle including a rear assembly, a front assembly, and a photovoltaic panel disposed between the rear assembly and the front assembly according to the present invention.

FIG. 1 depicts a perspective view of a preferred embodiment of a canopy 100 for a vehicle 124 according to the present invention. The canopy 100 comprises a rear assembly 102, a front assembly 108, and a photovoltaic panel 114. The photovoltaic panel 114 is disposed between the front assembly 108 and the rear assembly 102 directly over the operator of the vehicle 124 providing shade to the operator.

Although in this figure the rear assembly 102 and the front assembly 108 include curved sections, said assemblies may also be made from straight sections. Specifically, in an alternative embodiment (not shown), the rear assembly 102 and front assembly 108 are straight and coupled vertically to the vehicle 124, and the photovoltaic panel 114 is disposed straight and horizontally between the rear assembly 102 and front assembly 108. In yet another alternative embodiment (not shown), the canopy 100 comprises only a rear assembly 102 or a front assembly 108 and a photovoltaic panel 114. For instance, where the canopy 100 includes only the rear assembly 102 and the photovoltaic assembly 114, the rear assembly 102 includes a vertical section and a horizontal section and the photovoltaic panel 114 is disposed on the horizontal section of the rear assembly 102. In another instance, where the canopy 100 includes only the front assembly 108 and the photovoltaic assembly 114, the front assembly 108 includes a vertical section and a horizontal section and the photovoltaic panel 114 is disposed on the horizontal section of the front assembly 108.

According to this preferred embodiment, the vehicle 124 is an electric bicycle having a rechargeable battery 134. The vehicle 124 further includes an electric motor (not shown) which is powered by the battery 134. The photovoltaic panel 114 operates to convert solar energy into electrical energy which can be used to charge the battery 134. In an alternative embodiment, the electrical energy from the photovoltaic panel 114 may be used to power other electrical components, such as a smartphone, which may be carried by the operator of the vehicle 124.

The rear assembly 102 includes a first rear strut 104 and a second rear strut 106 separated by a first width $W_R$ at 140. The rear assembly 102 may be assembled as a unit utilizing a plurality of rods or trusses such as a truss 136. The front assembly 108 includes a first front strut 112 and a second front strut 110 separated by a second width $W_F$ at 142. The front assembly 108 may also be assembled as a unit utilizing a plurality of rods or trusses such as a truss 138. A first end 120 of the rear assembly 102 is coupled with a rear end 118 of the vehicle 124, and a first end 122 of the front assembly 108 is coupled with a front end 116 of the vehicle 124.

According to this preferred embodiment, the rear assembly 102 and the front assembly 108 include curved sections. A second end 128 of the rear assembly 102 is coupled with a second end 126 of the front assembly 108. The ends 126 and 128 may be coupled using a press fit, nuts and bolts, dowel pins, or other types of fastening mechanisms known to artisans of ordinary skill.

In a preferred embodiment, the rear assembly 102 comprises a curved section having a rear circular arc and a rear elliptical arc, wherein the rear circular arc comprises a rear radius $R_R$ and a rear central angle $\theta_R$, and the rear elliptical arc comprises a rear center $C_R$, a rear semi major axis $A_R$, and a rear semi minor axis $B_R$, discussed in more detail in connection with see FIG. 4. In another preferred embodiment, the front assembly 108 comprises a curved section having a front arbitrary arc, defined in a polar coordinate, of radius $r(\theta)$ and $\theta$, and a front straight horizontal section of length L, discussed in more detail in connection with see FIG. 5. Such curved sections provide an aesthetic canopy for the vehicle 124.

In a preferred embodiment, the first rear strut 104, the second rear strut 106, the first front strut 112, and the second front strut 110 are made from an 18-gauge aluminum tubing having an outer diameter of 0.63 inches and inner diameter of 0.57 inches. The first width $W_R$ at 140 is equal to the second width $W_F$ at 142 which is equal to 21.25 inches. The photovoltaic panel 114 is a flexible solar panel comprising semiconducting material. The photovoltaic panel 114 may be coupled with the battery 134 directly via an output line 132, or alternatively, via an electrical power controller 130. The electrical power controller 130 may include a voltage regulator, a boost converter, a buck converter, or a combination thereof. The voltage regulator operates to match and maintain the output voltage of the photovoltaic panel 114 at a charging voltage of the battery 134. The boost and buck converters are DC to DC converters and operate to step up and step down the output voltage of the photovoltaic panel 114, respectively.

Figure 2:
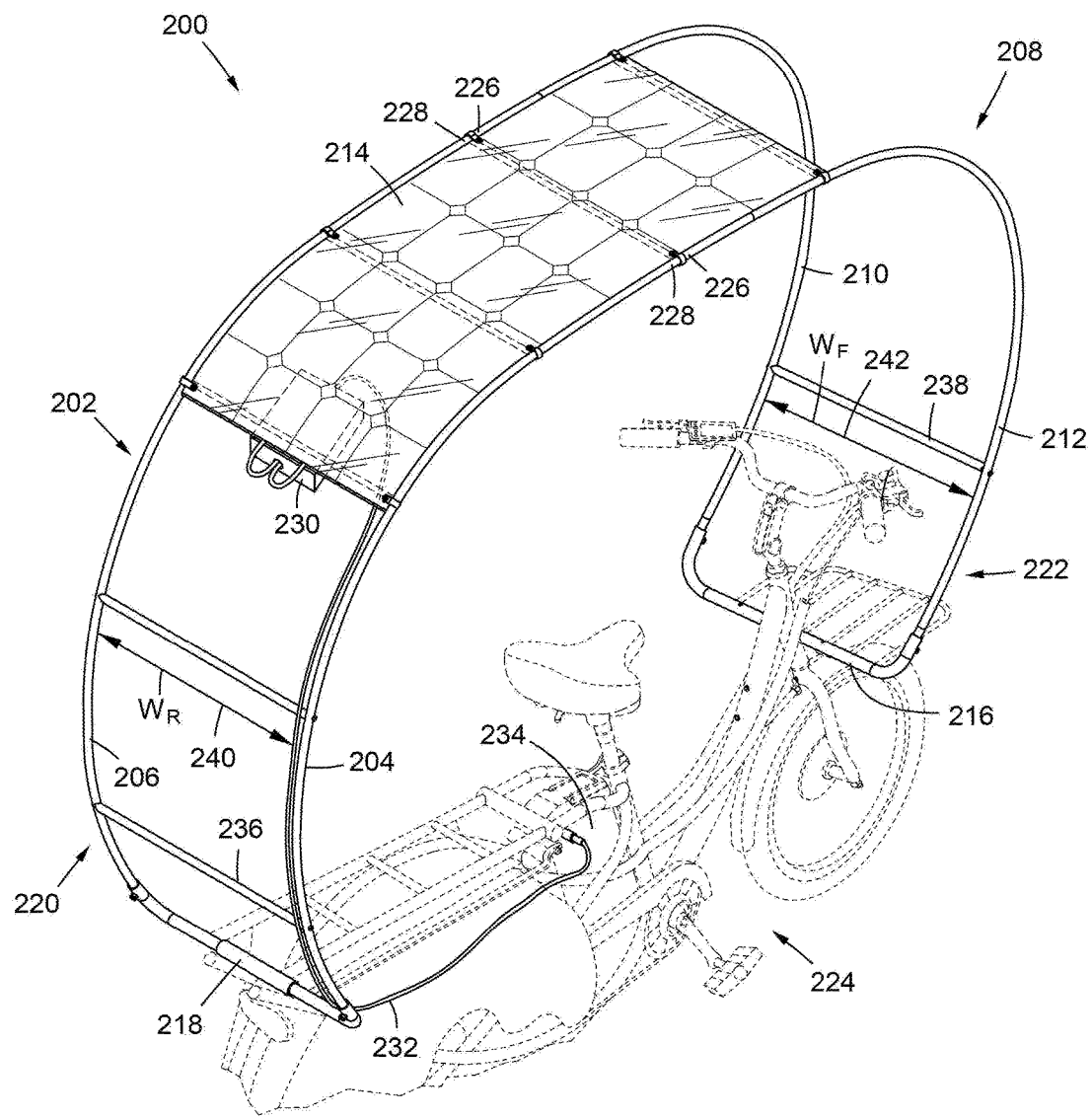
FIG. 2 shows a perspective view of a preferred embodiment of a canopy for a vehicle including a rear assembly, a front assembly, and a photovoltaic panel disposed between the rear assembly and the front assembly according to the present invention, further detailing the curved sections of the front and rear assemblies.

FIG. 2 depicts a perspective view of a preferred embodiment of a canopy 200 for a vehicle 224 according to the present invention. The canopy 200 comprises a rear assembly 202, a front assembly 208, and a photovoltaic panel 214. The photovoltaic panel 214 is disposed between the front assembly 208 and the rear assembly 202.

According to this preferred embodiment, the vehicle 224 is an electric bicycle having a rechargeable battery 234 and an electric motor (not shown) which is powered by the battery 134. The photovoltaic panel 214 operates to charge the battery 234. The rear assembly 202 includes a first rear strut 204 and a second rear strut 206 disposed from the first rear strut 204 by a first width $W_R$ at 240. The rear assembly 202 may be assembled as a unit utilizing a plurality of rods or trusses such as a truss 236. The front assembly 208 includes a first front strut 212 and a second front strut 210 disposed from the first front strut 212 by a second width $W_F$ at 242. The front assembly 208 may also be assembled as a unit utilizing a plurality of rods or trusses such as a truss 238. A first end 220 of the rear assembly 202 is coupled with a rear end 218 of the vehicle 224, and a first end 222 of the front assembly 208 is coupled with a front end 216 of the vehicle 224.

The rear assembly 202 and the front assembly 208 include curved sections. A second end 228 of the rear assembly 202 is coupled with a second end 226 of the front assembly 208. The rear assembly 202 comprises a curved section having a rear circular arc and a rear elliptical arc, wherein the rear circular arc comprises a rear radius $R_R$ and a rear central angle $\theta_R$, and the rear elliptical arc comprises a rear center $C_R$, a rear semi major axis $A_R$, and a rear semi minor axis $B_R$. The front assembly 208 comprises a curved section having a front circular arc and a front elliptical arc, wherein the front circular arc comprises a front radius $R_F$ and a front central angle $\theta_F$, and the front elliptical arc comprises a front center $C_F$, a front semi major axis $A_F$, and a front semi minor axis $B_F$. The photovoltaic panel 214 is coupled with the battery 234 directly via an output line and an electrical power controller 230.

Figure 3:
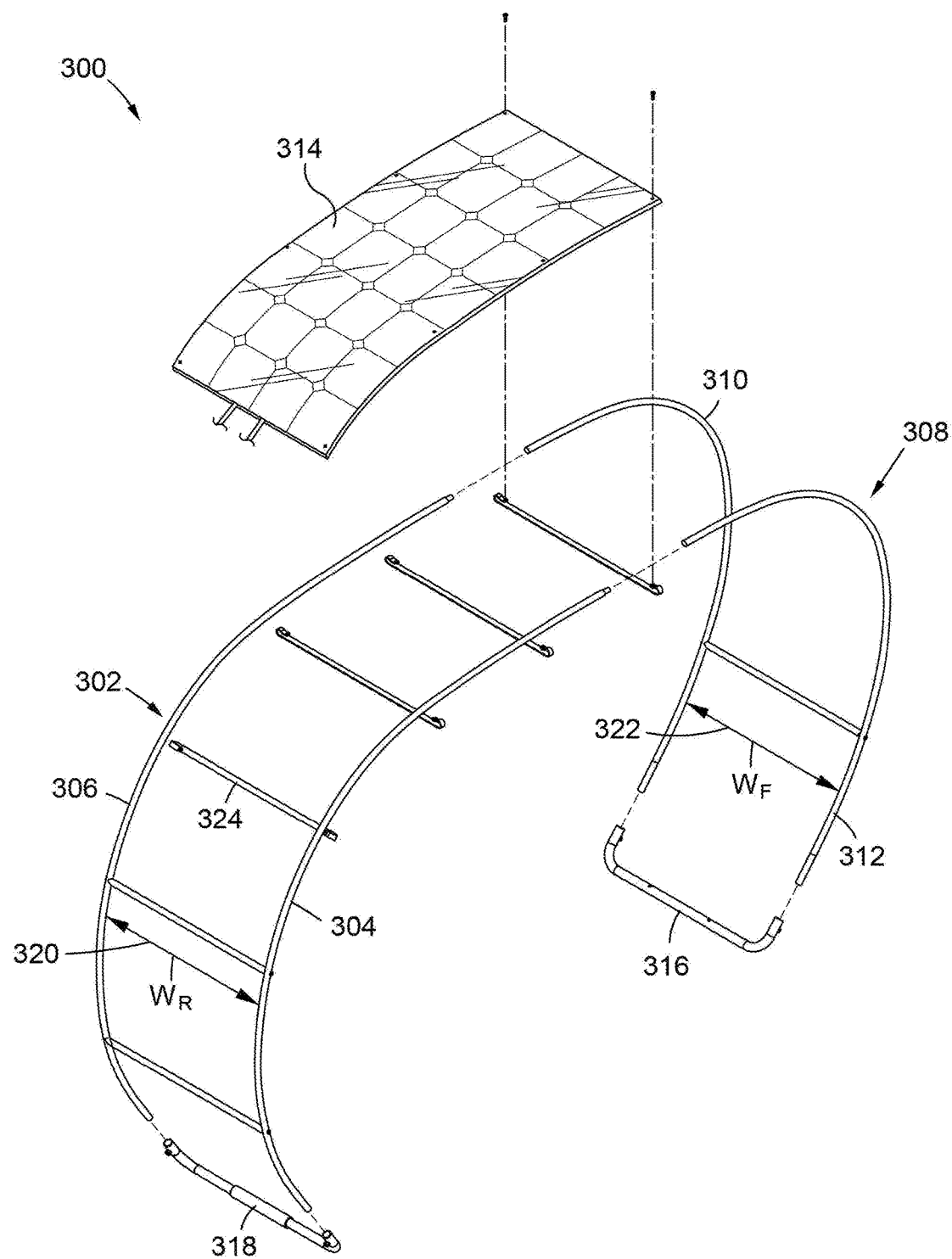
FIG. 3 shows an exploded view of a preferred embodiment of a canopy for a vehicle including a rear assembly, a front assembly, and a photovoltaic panel disposed between the rear assembly and the front assembly according to the present invention, further illustrating how the assemblies may be coupled together and how a flexible photovoltaic panel may be disposed between the front and rear assemblies.

FIG. 3 depicts an exploded view of a preferred embodiment of a canopy 300 for a vehicle (not shown) including a rear assembly 302, a front assembly 308, and a photovoltaic panel 314 disposed between the rear assembly 302 and the front assembly 308, further showing how the assemblies 302 and 308 may be coupled together and how the flexible photovoltaic panel 314 may be connected to them. The photovoltaic panel 314 operates to convert solar energy into electrical energy. The rear assembly 302 includes a first rear strut 304 and a second rear strut 306 separated by a first width $W_R$ at 320. The front assembly 308 includes a first front strut 312 and a second front strut 310 separated by a second width $W_F$ at 322. The rear and front assemblies 302 and 308, and the photovoltaic panel 314 are coupled together via plurality of rods such as the rod 324. Components 316 and 318 represent a rear end and a front end of the vehicle to which the assemblies 302 and 308 are coupled.

Figures 4, 5:
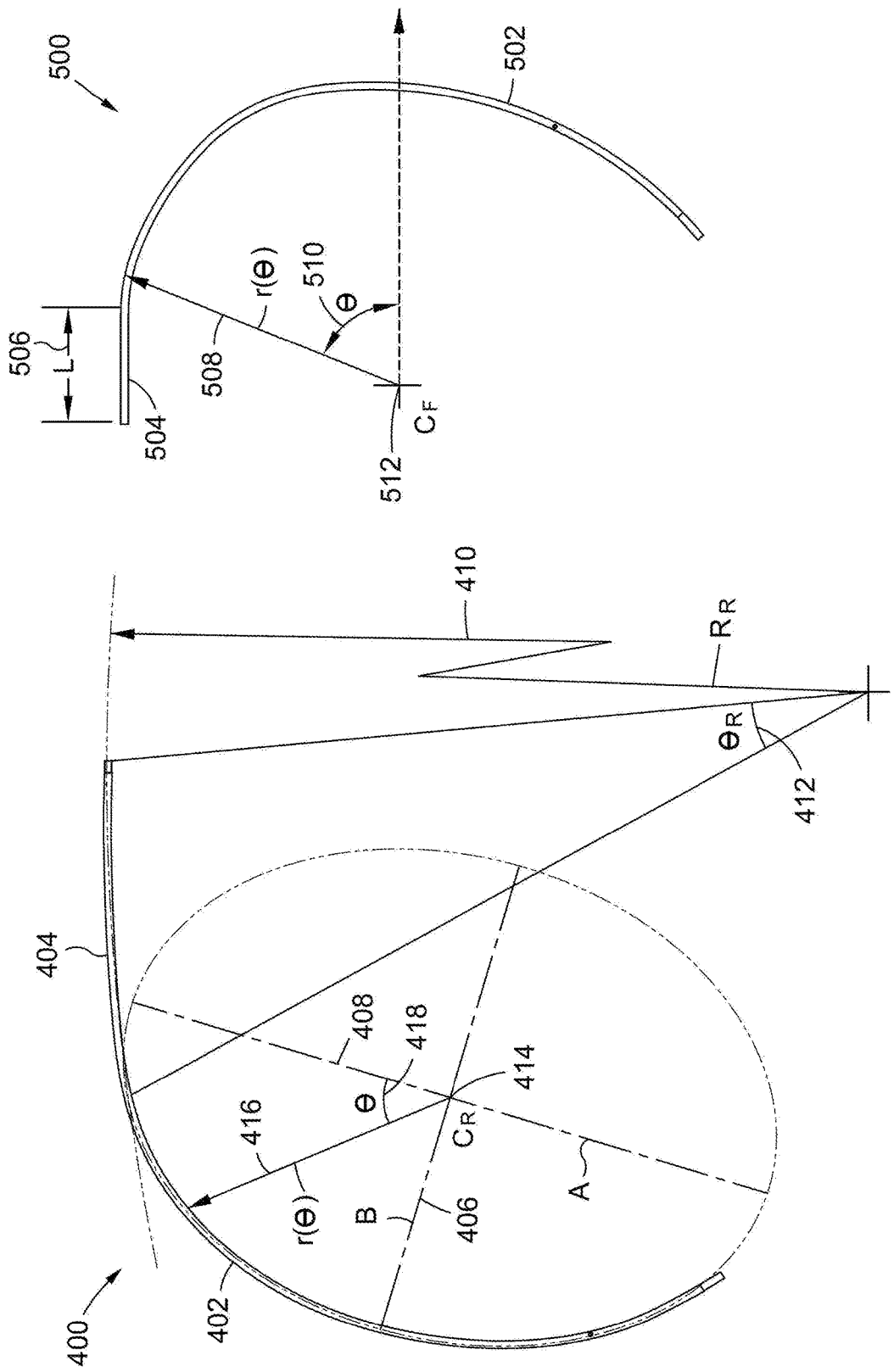
FIG. 4 shows a side view of a preferred embodiment of a rear assembly that may be used in a canopy for a vehicle according to the present invention, further detailing the geometry of the rear assembly.
FIG. 5 shows a side view of a preferred embodiment of a front assembly that may be used in a canopy for a vehicle according to the present invention, further detailing the geometry of the front assembly.

FIG. 4 depicts a side view of a preferred embodiment of a rear assembly 400 that may be used in a canopy such as the canopy 100 shown FIG. 1, further illustrating the geometry of the rear assembly 400. According to this embodiment, the rear assembly 400 is bent into an elliptical arc 402 and a circular arc 404.

The elliptical arc 402 is defined by its center $C_R$ at 414, semi major axis A at 408, and semi minor axis B at 406. In a polar coordinate, defined by r(θ) at 416 and θ at 418, the elliptical arc 402 may be expressed as:

$$r(\theta) = \frac{AB}{\sqrt{B^2\cos^2\theta + A^2\sin^2\theta}}$$

The circular arc 404 is defined by a rear radius $R_R$ at 410 and a rear central angle $\theta_R$ at 412.

FIG. 5 depicts a side view of a preferred embodiment of a front assembly 500 that may be used in a canopy such as the canopy 100 shown FIG. 1, further illustrating the geometry of the front assembly 500. According to this embodiment, the front assembly 500 is bent into a front curved section 502 having a front arbitrary arc, defined in a polar coordinate, centered at $C_F$ at 512, of radius r(θ) at 508 and θ at 510. The front assembly 500 further includes a front straight horizontal section 504 of length L at 506.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A system comprising:
   1) an electric bicycle comprising a battery; and
   2) a canopy attached to the electric bicycle, wherein the canopy comprises:
   (a) a rear assembly comprising a first rear strut and a second rear strut disposed a first width from the first rear strut, wherein said first rear strut and said second rear strut each comprise a rear curved section, wherein each rear curved section comprises a rear circular arc and a rear elliptical arc;
   (b) a front assembly comprising a first front strut and a second front strut disposed a second width from the first front strut, wherein said first front strut and said second front strut each comprise a front curved section, wherein each front curved section comprises a front circular arc and a front elliptical arc; and
   (c) a photovoltaic panel disposed between the rear assembly and the front assembly;
   wherein a first end of the rear assembly is coupled with a rear end of the electric bicycle;
   wherein a first end of the front assembly is coupled with a front end of the electric bicycle; and
   wherein the canopy further comprises an electrical output line coupled with the battery and the photovoltaic panel, said photovoltaic panel operative to charge the battery via the electrical output line.

2. The system of claim 1, wherein a second end of the rear assembly is coupled with a second end of the front assembly.

3. The system of claim 1, wherein each rear circular arc comprises a rear radius $R_R$ and a rear central angle $\theta_R$, and each rear elliptical arc comprises a rear center $C_R$, a rear semi major axis $A_R$, and a rear semi minor axis $B_R$.

4. The system of claim 1, wherein at least one of the first rear strut, the second, rear strut, the first front strut, and the second front strut is made from an 18-gauge aluminum tubing having an outer diameter of 0.63 inches and inner diameter of 0.57 inches.

5. The system of claim 1, wherein, the first width is equal to the second width.

6. The system of claim 1, wherein the first width is equal to 21.25 inches.

7. The system of claim 1, wherein the photovoltaic panel comprises semiconducting material.

8. The system of claim 1, wherein the photovoltaic panel comprises a flexible solar panel.

9. The system of claim 1, wherein each front circular arc comprises a front radius $R_F$ and a front central angle $\theta_F$, and each front elliptical, arc comprises a front center $C_F$, a front semi major axis $A_F$, and a front semi, minor axis $B_F$.

\* \* \* \* \*